3,476,803
DECARBOXYLATION
Lloyd Albert Pine, Baton Rouge, La., assignor to Esso Research and Engineering Company, a corporation of Delaware
No Drawing. Filed Mar. 16, 1966, Ser. No. 534,670
Int. Cl. C07c 51/38; C07b 25/00
U.S. Cl. 260—526                                    9 Claims

ABSTRACT OF THE DISCLOSURE

Carboxylic acids are decarboxylated and converted to organic compounds having one less carbon atom than the starting material by contacting a feed stream containing a carboxylic acid with an active form of a crystalline zeolite having the structure of faujasite. Any carboxylic acid may be decarboxylated with the process herein disclosed; however, polycarboxylic acids are the preferred feed stocks. In accordance with the disclosure, the conversion will be accomplished at temperatures ranging between 300 and 800° F. In a preferred embodiment, the faujasite catalyst of the present invention will contain one or more cations seected from the group consisting of hydrogen and the metals of Groups I–A, I–B, II–A, II–B and VIII of the Periodic Table. Silver, copper, sodium and zinc are the preferred metals. In a particularly preferred embodiment maleic acid is converted to acrylic acid by the process of this invention. The activity of the catalyst of this invention is compared, in the examples, with a catalyst prepared from a crystalline alumino-silicate zeolite having a structure similar to mordenite and other prior art catalyst.

---

The present invention relates to the production of organic compounds by catalytic decarboxylation of carboxylic acids having one more carbon atom than the desired compound. In particular, the present invention involves the production of carboxylic acids such as acrylic acid by the catalytic decarboxylation of dicarboxylic acids such as maleic acid or fumaric acid.

It has been known in the art to decarboxylate acids by passing them over catalysts comprising the oxides, carbonates and silicates of various metals at temperatures in the range between about 300° and 450° C. Such catalysts have been found to be particularly suitable for the decarboxylation of phthalic acid to give benzoic acid. Thus, a catalyst containing zinc aluminum oxide and sodium silicate was used for obtaining benzoic acid from phthalic acid in yields higher than 90%. However, when such catalyst was used to decarboxylate maleic acid, a yield of only 30% of acrylic acid was obtained.

The art further has suggested the possibility of utilizing amorphous zeolites as a support base for a catalytic metal such as copper in decarboxylation reations. Such an approach was quickly deemed to be unfeasible due to the rapid deactivation of these catalysts during the course of the reaction.

It has now been found, and as such represents the present inventive concept, that particular crystalline metal-aluminosilicate zeolites of the molecular sieve type are very superior decarboxylation catalysts. More specifically, it has been found that a metal ion containing faujasite molecular sieve will yield higher conversion and greater selectivities to desired products than any other catalyst heretofore known to the art while additionally exhibiting a very high degree of activity maintenance during the course of the reaction. This finding is especially surprising in that a closely related molecular sieve known as mordenite (the synthetic form), while like faujasite has relatively wide pores and has a silica to alumina ratio greater than 3, is an undesirable decarboxylation catalyst due to its rapid deactivation.

Faujasites which may be utilized as effective decarboxylation catalysts include the sodium form (which is the form in which both synthetic and natural faujasite is obtained) and cation-exchanged forms utilizing metal cations including hydrogen and those from Groups I–A, I–B, II–A, II–B and VIII of the Periodic Table or mixtures thereof to replace some or most of the sodium ions originally present in the exchangeable positions of the zeolite crystal lattice. The exchange of other metal cations for sodium is readily accomplished by conventional cation exchange techniques which are well known in the chemical art. Suitable forms of faujasite for the practice of the present invention are commercially available from the Linde Division of Union Carbide Corporation.

Particular metal cation forms of faujasite which are desirable for decarboxylation catalysis include silver, copper, sodium, zinc, nickel, iron, hydrogen and magnesium. Especially preferred metal cations include silver, copper, sodium and zinc. Most preferred are the silver and copper forms of faujasite.

The hydrogen form of faujasite is conveniently obtained by exchanging the sodium form of the sieve with an aqueous solution of a soluble ammonium salt such as the nitrate, chloride, sulfate, etc. The exchanged sieve is then dried and calcined at an elevated temperature to decompose the ammonium form yielding the hydrogen form and free ammonia gas.

For the purpose of convenience, future reference to "active form of faujasite" in this paper shall mean a faujasite molecular sieve which contains one or more of the enumerated metal cations in the exchangeable positions in the faujasite crystal lattice.

The active form of faujasite will catalyze a wide variety of decarboxylation reactions including decarboxylation of mono- and dicarboxylic acids or even higher states of carboxylation. The feed stock acid may be, for example, a normal chain saturated hydrocarbon monocarboxylic acid such as n-pentanoic acid or it may contain a functional group on the carbon skeleton such as levulinic acid which contains a gamma keto group, e.g.

$$CH_3—CO—(CH_2)_2—COOH$$

Similarly, the feed stock can comprise a dicarboxylic acid having an internal double bond such as maleic or fumaric acid. Additionally, the active forms of faupasite will effectively decarboxylate aromatic carboxy acids such as phthalic acid (which contain two carboxyl groups).

The decarboxylation reaction is conducted by contacting a catalyst bed comprising an active form of faujasite with a feed stock comprising the mono- or polycarboxylic acid, either neat or as an aqueous solution, at a temperature in the range between about 300 to 800° F., preferably 400 to 600° F., with a contact time of from about 10 to 60 seconds if the acid is neat, and a contact time of from about 4 to 30 seconds if the acid is in the form of an aqueous solution. Aqueous solutions used in faujasite catalyzed decarboxylation reactions will contain from about 20 to 90 wt. percent acid, preferably 30 to 70 wt. percent.

The utility of the active forms of faujasite in decarboxylation reactions is more clearly shown by reference to the following examples.

EXAMPLE 1

One of the more difficult decarboxylations to carry out is that of converting maleic acid to acrylic acid. An active form of faujasite which will effectively catalyze this reaction comprises a faujasite containing about 2.6 wt. percent sodium and 11.0 wt. percent copper. An aqueous solution containing 44.5 wt. percent of maleic acid was passed over the copper exchanged faujasite catalyst at 470° F. with a calculated 5.0 second contact time. Acrylic acid was formed at a 95% conversion level with 91% selectivity. The major portion of the loss in selectivity is due to ethylene formation from the further decarboxylation of the acrylic acid formed in the reaction.

EXAMPLE 2

This example shows the unexpected nature of the finding of the extremely high decarboxylation activity in the copper form of faujasite. A copper exchanged synthetic mordenite was prepared by exchanging a commercially obtained synthetic sodium mordenite (obtained from the Norton Company). This catalyst contained about 4.7 wt. percent copper. As in Example 1, an aqueous solution containing 43.4 wt. percent maleic acid was passed over the catalyst bed at a temperature of 470° F. with a contact time of about 5.0 seconds. The initial activity of the catalyst showed only 49% conversion to acrylic acid (at 99.0% selectivity) which was only slightly more than 50% of the activity exhibited by the copper faujasite catalyst of Example 1.

EXAMPLE 3

This example indicates the vastly superior catalyst activity retention properties of copper faujasite as compared to copper mordenite. The copper mordenite catalyst was contacted with an aqueous solution containing 43.4 wt. percent maleic acid for a period of time. During regular intervals in this period, the activity of the catalyst was tested. Additionally, the reaction temperature was adjusted to substantially higher levels in order to attempt to overcome the rather obvious rapid deactivation. The results of this experiment are tabulated below:

| Time on Feed, Min. | Reaction Temperature, ° F. | Conversion, Percent |
|---|---|---|
| 20 | 440 | 42 |
| 98 | 450 | 15 |
| 168 | 500 | 12 |
| 211 | 560 | 13 |

In sharp contrast to the above run, the copper faujasite catalyst of Example 1 was run for about 720 minutes without observing a deleterious change in its acitvity at its initial temperature level.

EXAMPLE 4

This example discloses the effect of changing the metal cation in the faujasite crystal lattice. Table I below gives the results of a series of experiments using various metal cation exchanged forms of faujasite. All runs were made with a 20 cc. catalyst charge and with a 36 wt. percent solution of maleic acid in water as the feed. The feed rate was about 8 ml./hr. and all runs were conducted at atmospheric pressure. A stream of nitrogen was passed through the reactor at a constant rate of 10 cc./min. The gaseous reactor effluent was analyzed for carbon dioxide and ethylene by gas chromatography using the nitrogen as an internal standard. Yields of acrylic acid calculated in this manner have been checked by titration. Due to the relatively short duration of the runs (120–180 minutes) the selectivities given in Table I might be slightly on the high side.

TABLE I

| Cation | Temp.,° F. | Conversion | Selectivity |
|---|---|---|---|
| Zn | 470 | 30 | 100 |
| Zn | 509 | 70 | 100 |
| Zn | 570 | 93 | 99 |
| Na | 490 | 75 | 100 |
| Na | 520 | 98 | 99 |
| Fe | 460 | 25 | 100 |
| Fe | 530 | 60 | 100 |
| Ni | 490 | 50 | 100 |
| Ni | 540 | 80 | 99 |
| Ni | 530 | 62 | 100 |
| H | 470 | 25 | 100 |
| H | 530 | 60 | 100 |
| Ag | 480 | 88 | 100 |
| Mg | 460 | 10 | 100 |
| Mg | 520 | 30 | 100 |

When all of the cations are compared at the same operating conditions the following comparative order of activity is obtained:

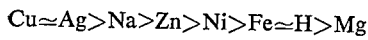

Examples 5 and 6 indicate the variety of carboxylic acids which can be effectively decarboxylated by the faujasite catalysts of the present invention.

EXAMPLE 5

A saturated, straight chain monocarboxylic acid, e.g., n-pentanoic acid, was decarboxylated by contacting it neat with a copper faujasite catalyst of Example 1 at 420° F. and a contact time of 39.2 seconds. The resulting conversion was found to be 60.1%.

EXAMPLE 6

A monocarboxylic acid having a keto group gamma to the carboxyl group, e.g., levulinic acid

was effectively decarboxylated by contacting an aqueous solution containing 40 wt. percent of levulinic with the copper faujasite catalyst of Example 1 at a temperature of 425° F. and a contact time of 10.3 seconds. The resulting conversion was found to be 54%.

EXAMPLE 7

This example compares the decarboxylation activity and selectivity of the copper faujasite catalyst of the present invention with the best decarboxylation catalyst previously found in the art. The source of the comparison is U.S. Patent No. 2,902,512, issued Sept. 1, 1959 to Albert Verheyden et al. The catalyst disclosed in that patent consists of a mixture of silica, copper oxide and a barium compound (such as barium naphthenate). The results obtained by patentees in their decarboxylation of maleic acid are given in Table II below for each of the eight examples reported by the patentees. Also given in Table II are comparable runs made with the copper faujasite catalyst of the present invention.

TABLE II.—TABULATION OF DATA FROM EXAMPLES IN U.S. 2,902,512

Feed: 39.5 Wt. Percent Maleic Acid in Water Plus 1.7 Vol. Percent O$_2$

Temperature: 240–250° C. (464–482° F.)

| Example | Space Velocity | Contact Time, Sec. | Conversion | Selectivity | Activity Maintenance |
|---|---|---|---|---|---|
| 1 | 365 | 8.9 | 62 | 78.3 | 100 hrs. |
| 2 | 280 | 12.5 | 62 | 68.7 | |
| 3 | 365 | 9.8 | 56 | 70.5 | |
| 4 | 365 | 9.8 | 74.2 | 82.2 | Conversion down to 30% in 5 hrs. |
| 5 | 365 | 9.8 | 27.6 | 75.0 | Lost activity in 10 hrs. |
| 6 | 365 | 9.8 | 38.7 | 63.5 | Activity declines rapidly. |
| 7 | 365 | 9.8 | 64.0 | 76.8 | Activity limited in time. |
| 8 | 365 | 9.8 | 69.0 | 72.0 | Maintained for more than 30 hrs. |

COPPER FAUJASITE CATALYST

Feed: 40 Wt. Percent Maleic Acid in Water

| Run | Temperature, °F. | Contact Time, Sec. | Conversion | Selectivity | |
|---|---|---|---|---|---|
| 1 | 470 | 5.1 | 95.0 | 92.2 | No sign of activity loss after 12 hrs. |
| 2 | 462 | 5.1 | 90.3 | 96.8 | Do. |
| 3 | 408 | 6.0 | 34.4 | 100.0 | Do. |
| 4 | 434 | 10.3 | 94.2 | 98.8 | Do. |
| 5 | 425 | 10.3 | 80.0 | 100.0 | Do. |

The above results clearly show the marked superiority of the catalyst of the present invention in virtually all aspects when compared to the best previously known decarboxylation catalysts.

What is claimed is:

1. A process for decarboxylating a carboxylic acid comprising contacting a feed stream containing said carboxylic acid with a catalytically active form of faujasite, said faujasite being characterized by having a metal cation selected from the group consisting of the cations of hydrogen and Groups I–A, I–B, II–A, II–B, VIII and mixtures thereof of the Periodic Table in the exchangeable position in its crystalline lattice, at elevated temperatures within the range between about 300 to 800° F., for a time sufficient to convert at least a portion of said carboxylic acid to a compound having at least one less carbon atom than said carboxylic acid.

2. The process of claim 1 wherein said carboxylic acid in said feed stream is a polycarboxylic acid and said polycarboxylic acid is converted at least in part to a carboxylic acid having fewer carboxyl groups than said polycarboxylic acid.

3. The process of claim 2 wherein said polycarboxylic acid is maleic acid and said carboxylic acid having fewer carboxyl groups is acrylic acid.

4. The process of claim 3 wherein said active form of faujasite is copper faujasite.

5. The process of cliam 3 wherein said active form of faujasite is silver faujasite.

6. The process of claim 3 wherein said active form of faujasite is sodium faujasite.

7. The process of claim 3 wherein said active form of faujasite is zinc faujasite.

8. The process of claim 1 wherein said carboxylic acid in said feed and stream is a monocarboxylic acid which is converted to a compound devoid of any carboxyl groups.

9. The process of claim 8 wherein said monocarboxylic acid is a saturated, straight chain acid, and said active form of faujasite is copper faujasite.

References Cited

UNITED STATES PATENTS

| 1,953,232 | 4/1934 | Jaeger | 260—522 |
| 1,964,516 | 6/1934 | Jaeger | 260—522 |
| 2,902,512 | 9/1959 | Verheyden. | |

LORRAINE A. WEINBERGER, Primary Examiner

M. G. BERGER, Assistant Examiner

U.S. Cl. X.R.

260—522, 595, 676